July 10, 1923.
A. H. MITTAG
SHIP PROPULSION SYSTEM
Filed Sept. 19, 1921
1,461,552
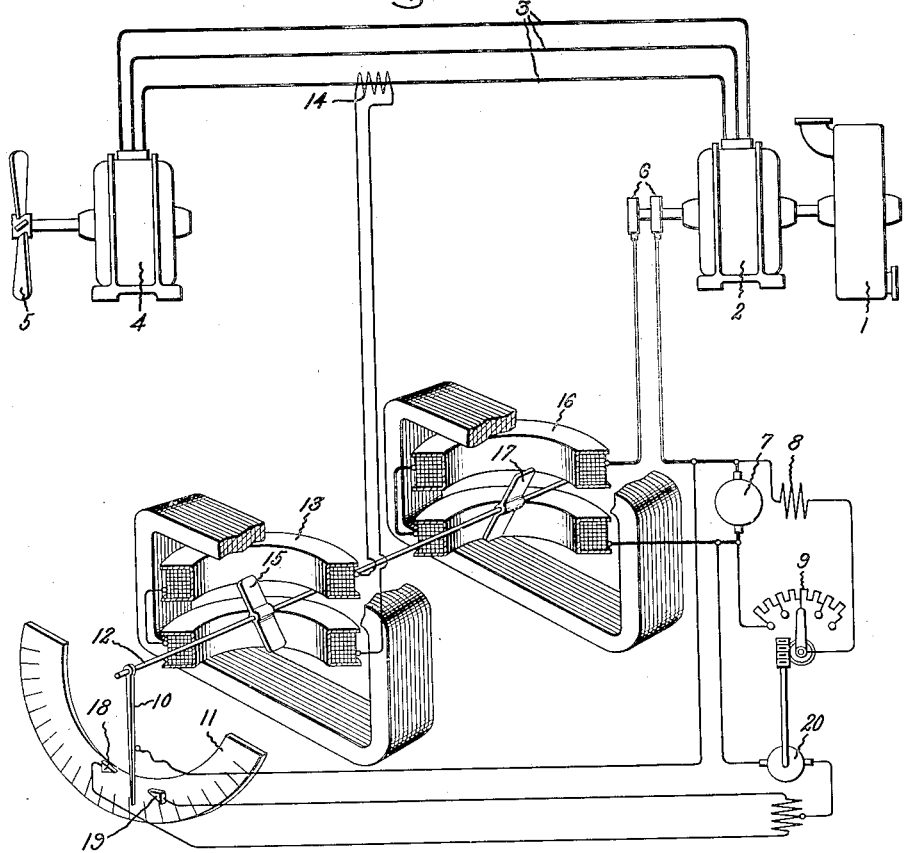
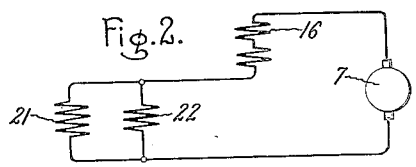
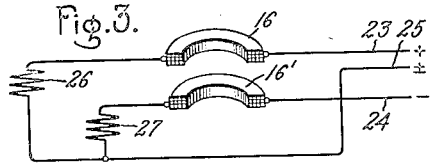
Inventor:
Albert H. Mittag,
by Albert G. Davis
His Attorney.

Patented July 10, 1923.

1,461,552

UNITED STATES PATENT OFFICE.

ALBERT H. MITTAG, OF SCHENECTADY, NEW YORK, ASSIGNOR TO GENERAL ELECTRIC COMPANY, A CORPORATION OF NEW YORK.

SHIP-PROPULSION SYSTEM.

Application filed September 19, 1921. Serial No. 501,652.

*To all whom it may concern:*

Be it known that I, ALBERT H. MITTAG, a citizen of the United States, residing at Schenectady, county of Schenectady, State of New York, have invented certain new and useful Improvements in Ship-Propulsion Systems, of which the following is a specification.

My invention relates to stability indication and regulation in electric power systems wherein an induction or synchronous motor is supplied from an adjustable speed synchronous generator and is particularly useful in electric ship propulsion systems.

An object of my invention is to provide an improved system of connections and method of operation which shall enable the excitation of the system to be accurately maintained at the minimum value essential for stable operation of the motor thereby permitting the system to be efficiently operated and the full capacity of the generator utilized.

In the accompanying drawing, Fig. 1 represents my invention embodied in an electric power system diagrammatically shown as an electric ship propulsion system. Figs. 2 and 3 are circuit diagrams showing how the invention may be applied to synchronous motor power systems.

The capacity of a ship propulsion system is limited by the heating of the generator field winding and any such system to be practically successful must therefore permit the excitation of the generator to be kept as low as possible without permitting the propeller driving motor to fall out of step. It has heretofore been proposed to provide stability indicating and regulating means responsive to the ratio of line volts to line amperes. Such means are disclosed in the application of Ernst F. W. Alexanderson, Serial No. 368,196, filed March 23, 1920, assigned to the assignee of the application. This ratio is constant at the maximum output of the alternator at different degrees of excitation. If for example while the speed is kept constant the excitation is reduced to one-half, the voltage and line current are each reduced in the same proportion while the maximum output of the system is reduced to one-quarter. If, however, the excitation is kept constant and the speed and therefore the frequency reduced to one-half, the voltage will fall to one-half, but the line current will remain substantially constant, since the equivalent inpedance of the system will fall substantially to one-half. The maximum output of the system is therefore reduced one-half but occurs at the same value of line current. According to the system disclosed in the Alexanderson application means respectively responsive to line voltage and line current are arranged to act in opposition on the responsive element of an indicator or regulator. Such means will give a true indication of the stability of the system for changes in voltage due to changes in excitation, but in order to cause the instrument to give a true indication of the stability of the system for changes in voltage due to changes in frequency means such as a reactance are provided to render the voltage responsive means independent of changes in frequence. According to my invention the stability indicating or regulating means is made responsive to the ratio of the line amperes to excitation amperes, thereby rendering the use of such reactance or equivalent means unnecessary. The maximum output of an alternator varies as the square of the field current as long as the magnetic circuit of the alternator is unsaturated, and generally speaking, there is very little saturation in the alternator when the motor is so heavily loaded that it is on the point of falling out of step. A reduction in excitation to one-half reduces the line volts and line amperes to one-half and the maximum output to quarter. A reduction in speed has no effect on the line amperes or the exciting current. Therefore the line current for the alternator must vary directly as the direct current field excitation at the maximum output of the alternator.

My invention will be better understood from the following description taken in connection with the accompanying drawing and its scope will be pointed out in the appended claims.

Referring to the accompanying drawing an adjustable speed prime mover, diagrammatically represented as an elastic-fluid turbine 1, is arranged to drive directly the rotatable field element of the synchronous generator 2, connected through lines 3 to the work motor 4, which may be either an induction or a synchronous motor. The motor 4 is represented in the drawing as having its rotatable element directly connected to a propeller 5. Circuit controlling and reversing switches will be provided in the lines 3, but inasmuch as these devices are old in the art and no part of my invention they are not illustrated. Exciting current is supplied to the field winding of the generator 2 through the slip rings 6. Exciting current is supplied by these slip rings from any suitable source of exciting current represented as a direct current generator 7 provided with a field winding 8. The rheostat 9 in circuit with the winding 8 may be provided for controlling the value of the exciting current. The relative values of the line current and excitation current may be determined in any suitable way and by various forms of instruments. In the drawing the stability responsive device is represented as provided with a pointer 10 coöperating with a scale 11. The pointer 10 is mounted on a shaft 12, the rotation of which is unrestrained. The shaft is, therefore, free to rotate into any position where the coils of the instrument may tend to place it. By means of suitable coils or windings a torque dependent upon the line current is exerted on the shaft 12 to turn it in one direction while at the same time a counter-torque dependent on the exciting current is exerted on the shaft 12 to turn it in the other direction. The final position of the shaft depends upon the relative values of the two opposing torques and not at all upon their absolute value. Various devices may be used to exert the opposing torques. In the instrument illustrated a pair of stationary coils 13 in series relation with the line connecting the generator 2 with motor 4, as by means of the current transformer 14, are arranged to act upon a magnetic vane 15 located within the influence of the coils 13. Stationary coils 16 in series relation with the exciting circuit to the generator 2 are arranged to act upon a corresponding vane 17. The vanes 15 and 17 are displaced from each other by an angle of about 75 or 80 degrees. The lines of force produced by the coils 13 tend to rotate the shaft 12 in a clockwise direction while those produced by the coil 16 tend to rotate the shaft in a counter-clockwise direction. As thus arranged the position of the pointer 10 is dependent upon the ratio between the line current and excitation current, and, therefore, indicates the electrical condition of the system as far as the stability of operation is concerned, and indicates to the operator whether or not the exciting current is greater or less than that necessary for stable operation. If the instrument indicates that the exciting current is greater than that necessary to hold the motors safely in step, the operator will adjust the resistance 9 to reduce the exciting current and thus increase the efficiency of the operation for the particular load being carried. Similarly if the instrument indicates that an unstable range of operation is being approached so that there is danger of the motors falling out of step the operator will increase the exciting current.

In order to make the regulation of the exciting current automatic a pair of contacts 18 and 19 may be arranged to coöperate with the pointer 10 to control a pilot motor 20 connected in any suitable way to operate the rheostat 9. Engagement of the pointer 10 with the contact 18 will operate the pilot motor in one direction while engagement with the contact 19 will operate the pilot motor in the other direction in a manner well known in the art.

While I have represented the regulation as being secured by a rheostat directly connected in the field circuit of the exciting generator, it is obvious to those skilled in the art that it is immaterial as far as my invention is concerned whether the regulation is secured by operating upon the exciter directly or upon an exciter for the exciter or by operating regulating means such as a booster or bucker or regulating resistance in series relation with the exciting circuit.

In power systems utilizing synchronous motors, it is preferable to regulate the excitation of the motor as well as the excitation of the generator. Where the motor and generator field windings are supplied in parallel from the exciter, the coils of the instrument measuring the exciting current may be connected in series with the circuit supplying both field windings. This is diagrammatically represented in Fig. 2 where the exciter 7 is connected to the coils 16 to supply the windings 21 and 22 which may represent the field windings of the motor and generator respectively.

Where separate sources of excitation are provided for the motor and generator field windings, exciting current responsive coils on the instrument may be provided in circuit with each field winding. Such a system is diagramatically represented in Fig. 3 wherein the exciting source is represented as a three-wire system comprising positive and negative mains 23 and 24 and a neutral main 25. In this figure one of the coils 16 is shown in circuit with the main 23 and winding 26 which may represent the motor winding, while the other coil 16' is shown in circuit with the main 24 and the winding 27 which may represent the generator winding. Coils 16 and 16' will be arranged to produce fluxes in the same direction. It is obvious to those skilled in the art that it is immaterial whether the windings are arranged as shown in Fig. 3 or each of the two coils 16 provided with a section in circuit with the motor field winding and another section in circuit with the generator field winding.

What I claim as new and desire to secure by Letters Patent of the United States, is,—

1. In an electric power system wherein a variable speed synchronous generator is arranged to supply operating current to an alternating current work motor, stability responsive means comprising a pair of coils arranged to produce opposing effects and connected respectively in series relation with the work motor and generator field circuit.

2. In a ship propulsion system wherein a synchronous generator is arranged to supply driving current to a propeller driving motor and wherein means are provided for adjusting the speed and excitation of the generator, a stability responsive device comprising means responsive to the propeller motor current and means responsive to the generator field current.

3. An electric ship propulsion system comprising a variable speed synchronous generator and an alternating current propeller driving motor, characterized by the fact that means are provided for controlling the excitation of said generator in accordance with the ratio between motor current and generator exciting current.

4. An electric ship propulsion system comprising an adjustable speed prime mover, a synchronous dynamo electric machine driven thereby, a propeller, an alternating current dynamo electric machine for driving said propeller, means for controlling the excitation of one of said machines, and means for regulating said excitation controlling means comprising a winding responsive to the current supplied to said propeller driving machine and a winding responsive to the exciting current of said synchronous machine.

5. The method of operating a ship propulsion system comprising a variable speed synchronous generator, connected to operate a propeller driving motor which consists in maintaining a predetermined ratio between motor current and generator excitation thereby maintaining the generator in such condition that stable operation of the motor will be secured.

In witness whereof, I have hereunto set my hand this 17th day of September, 1921.

ALBERT H. MITTAG.